(12) United States Patent
Kuen et al.

(10) Patent No.: US 12,136,185 B2
(45) Date of Patent: Nov. 5, 2024

(54) MULTI-SCALE DISTILLATION FOR LOW-RESOLUTION DETECTION

(71) Applicant: ADOBE INC., San Jose, CA (US)

(72) Inventors: Jason Kuen, Santa Clara, CA (US); Jiuxiang Gu, Baltimore, MD (US); Zhe Lin, Clyde Hill, WA (US)

(73) Assignee: ADOBE INC., San Jose, CA (US)

( * ) Notice: Subject to any disclaimer, the term of this patent is extended or adjusted under 35 U.S.C. 154(b) by 438 days.

(21) Appl. No.: 17/455,134

(22) Filed: Nov. 16, 2021

(65) Prior Publication Data

US 2023/0153943 A1   May 18, 2023

(51) Int. Cl.
 *G06T 3/4046*  (2024.01)
 *G06N 3/045*  (2023.01)
 *G06N 3/08*  (2023.01)
 *G06V 10/75*  (2022.01)

(52) U.S. Cl.
 CPC .......... *G06T 3/4046* (2013.01); *G06N 3/045* (2023.01); *G06N 3/08* (2013.01); *G06V 10/751* (2022.01)

(58) Field of Classification Search
 None
 See application file for complete search history.

(56) References Cited

U.S. PATENT DOCUMENTS

| | | | |
|---|---|---|---|
| 2022/0083868 A1* | 3/2022 | Zhou | G06N 3/084 |
| 2022/0126864 A1* | 4/2022 | Moustafa | G06T 1/0007 |
| 2022/0180199 A1* | 6/2022 | Xu | G06V 10/82 |

OTHER PUBLICATIONS

1Qi, et al., "Multi-Scale Aligned Distillation for Low-Resolution Detection", In Proceedings of the IEEE/CVF Conference on Computer Vision and Pattern Recognition (pp. 14443-14453), 2021.

* cited by examiner

*Primary Examiner* — Leon Viet Q Nguyen
(74) *Attorney, Agent, or Firm* — CHAU & ASSOCIATES, LLC

(57) ABSTRACT

Systems and methods for image processing are described. The systems and methods include receiving a low-resolution image; generating a feature map based on the low-resolution image using an encoder of a student network, wherein the encoder of the student network is trained based on comparing a predicted feature map from the encoder of the student network and a fused feature map from a teacher network, and wherein the fused feature map represents a combination of first feature map from a high-resolution encoder of the teacher network and a second feature map from a low-resolution encoder of the teacher network; and decoding the feature map to obtain prediction information for the low-resolution image.

19 Claims, 9 Drawing Sheets

MULTI-SCALE DISTILLATION FOR LOW-RESOLUTION DETECTION

BACKGROUND

The following relates generally to image processing, and more specifically to object detection.

Digital image processing refers to the use of a computer to edit a digital image using an algorithm or a processing network. Image processing software is commonly used for image editing, robot navigation, etc. Object detection is an example of an image processing task that identifies and labels objects within an image. In some cases, object detection enables computers to interpret visual information similar to human beings. Image processing systems can label images in a dataset based on detected objects.

In some cases, object detection can be combined with other computer vision tasks such as semantic segmentation and instance segmentation. Semantic segmentation refers to the assignment of categories (e.g., vehicle, animal, etc.) to each pixel in an image. Instance segmentation refines semantic segmentation by detecting the instances of each category. For example, multiple cars can be identified within an image.

Recently, deep learning techniques are used for object detection. However, deep learning-based methods often involve high computation costs and depend on the availability of high-resolution input. As a result, these methods are not easily adopted in real-world systems with limited computational complexity or where a high-resolution input is not available. Therefore, there is a need in the art for improved object detection systems that can provide accurate results and reduced computational costs using low-resolution input.

SUMMARY

The present disclosure describes systems and methods for object detection. In some embodiments, a teacher network is trained that includes both high resolution and low resolution encoders. The accuracy of the teacher network can then be transferred to a student network that takes only low resolution input. In some examples, a crossing feature-level fusion module is used to combine the high resolution and low resolution feature maps from the teacher network so they can be compared to the low resolution feature maps of the student network during training.

A method, apparatus, non-transitory computer readable medium, and system for image processing are described. One or more embodiments of the method, apparatus, non-transitory computer readable medium, and system include receiving a low-resolution image; generating a feature map based on the low-resolution image using an encoder of a student network, wherein the encoder of the student network is trained based on comparing a predicted feature map from the encoder of the student network and a fused feature map from a teacher network, and wherein the fused feature map represents a combination of first feature map from a high-resolution encoder of the teacher network and a second feature map from a low-resolution encoder of the teacher network; and decoding the feature map to obtain prediction information for the low-resolution image.

A method, apparatus, non-transitory computer readable medium, and system for training a neural network are described. One or more embodiments of the method, apparatus, non-transitory computer readable medium, and system include receiving a high-resolution version of a student training image and a low-resolution version of the student training image; generating a first feature map based on the high-resolution version of the student training image using a high-resolution encoder of a teacher network; generating a second feature map based on the low-resolution version of the student training image using a low-resolution encoder of the teacher network; generating a fused feature map based on the first feature map and the second feature map using a crossing feature-level fusion module of the teacher network; generating a third feature map based on the low-resolution version of the student training image using an encoder of a student network; computing a knowledge distillation (KD) loss based on a comparison of the third feature map from the student network and the fused feature map from the teacher network; and updating parameters of the student network based on the KD loss.

An apparatus, system, and method for training a neural network are described. One or more aspects of the apparatus, system, and method include a high-resolution encoder of a teacher network configured to generate a first feature map based on a high-resolution version of a student training image; a low-resolution encoder of the teacher network configured to generate a second feature map based on a low-resolution version of the student training image; a crossing feature-level fusion module of the teacher network configured to generate a fused feature map based on the first feature map and the second feature map; and an encoder of a student network configured to generate a third feature map based on the low-resolution version of the student training image, wherein the encoder of the student network is trained using a KD loss based on a comparison of the third feature map from the student network and the fused feature map from the teacher network.

DETAILED DESCRIPTION

The present disclosure describes systems and methods for image processing. Embodiments of the disclosure include a machine learning model. In some embodiments, a high resolution (i.e., teacher) network model distills knowledge to a low-resolution (i.e., student) network model which increases the performance of low-resolution models. The teacher network can include both high-resolution and low-resolution input, and cross feature-level knowledge distillation process can dynamically fuse the multi-resolution features of the teacher network to increase the effectiveness of the guidance for the student network.

Image processing systems can perform classification, object localization, semantic segmentation, and instance-level segmentation. However, conventional systems require high resolution input to perform such operations on the images. Input resolution may be reduced to accelerate image processing tasks but reducing input resolution results in performance degradation. The computational complexity of deep-learning-based instance-level detection models can make the deep learning models unsuitable for use in real-world applications such as image processing on mobile devices or robotic navigation.

Embodiments of the present disclosure include an image processing system that uses knowledge distillation to train a low-resolution network that can achieve performance similar to a high-resolution network. In some cases, the pyramid features from the two input resolutions are dynamically fused using the crossing feature-level fusion (C-FF) module. The teacher network model provides training signals to the low-resolution student network as the student network does not have access to fine-visual details available in high resolution images. As a result, embodiments of the present disclosure increase performance and accuracy levels of low-resolution detection models.

By applying the unconventional multi-scale knowledge distillation, embodiments of the present disclosure increase performance of low-resolution models. In some examples, a cross feature-level module uses knowledge distillation to increase guidance to the student network. Hence, performance on low-resolution instance-level detection tasks increases while reducing computational requirement and increasing applicability to real-world scenarios.

Image Editing System

Figure 1:
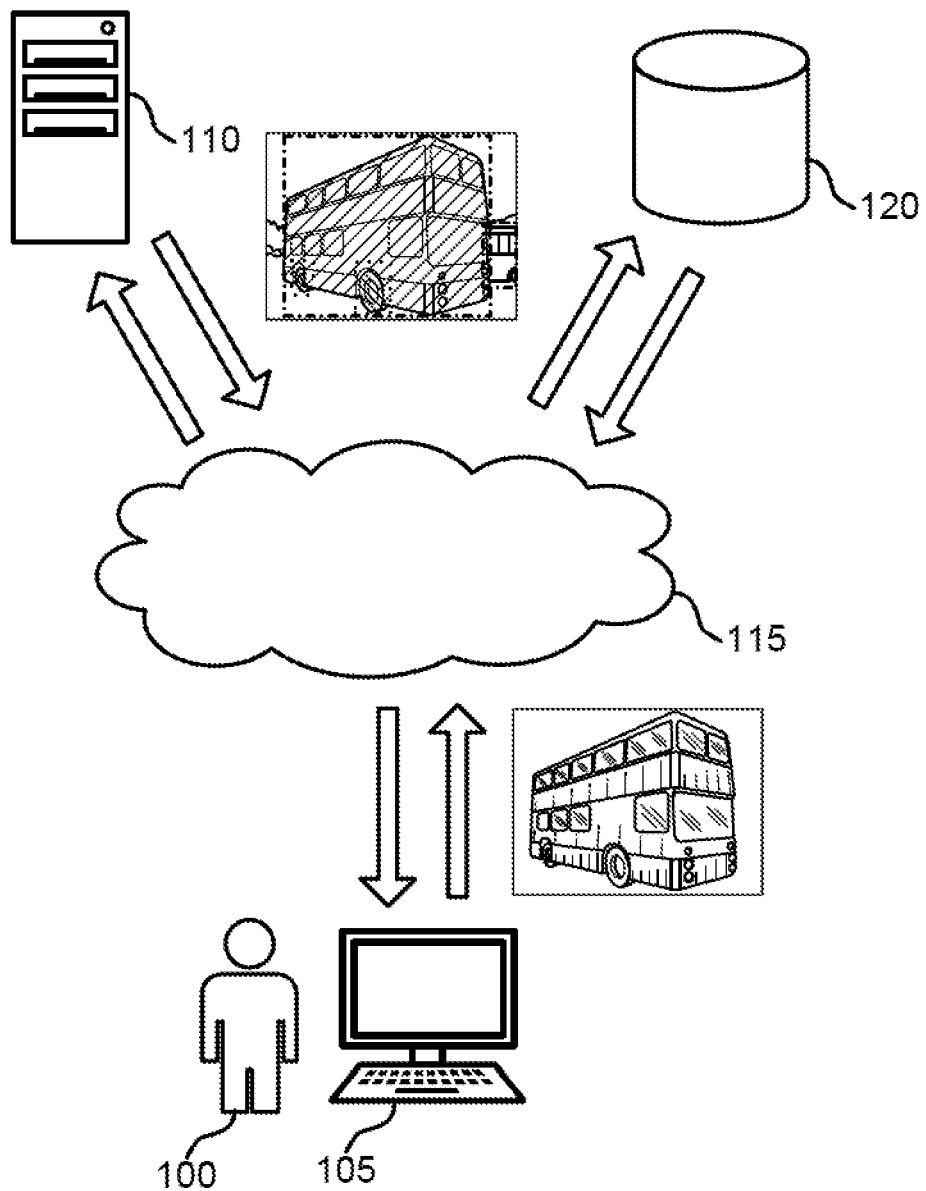
FIG. 1 shows an example of an image editing system according to aspects of the present disclosure.

FIG. 1 shows an example of an image editing system according to aspects of the present disclosure. The example shown includes user 100, user device 105, image processing apparatus 110, cloud 115, and database 120.

According to an embodiment, a user 100 provides an image (e.g., a low-resolution image) via a user device 105 to the image processing apparatus 110. The user device 105 may communicate the image via the cloud 115. In some cases, the image is selected from a set of images stored in the database 120.

The image processing apparatus 110 detects one or more objects in the image (e.g., a vehicle), and provides the object detection data back to the user 100. In some cases, the object detection information includes object labels and location and size information for a bounding box. Then, the user 100 can use the object detection data to perform a task such as editing the image. In other applications, a robot or a vehicle may use the information to navigate an environment, or a video processing system may use the information to detect objects in a video.

Although FIG. 1 shows an example that includes communication via the cloud 115, some embodiments of the present invention perform image processing locally at the user device 105. The user device 105 can be a personal computer, laptop computer, mainframe computer, palmtop computer, personal assistant, mobile device, a vehicle computing device or any other suitable processing apparatus.

Embodiments of the image processing apparatus 110 include a two-stage multi-scale distillation framework for low resolution instance-level detection tasks. In some cases, the first stage trains a multi-resolution teacher network and the second stage trains a low-resolution student network with the guidance of the multi-resolution teacher. For example, a base detection method is used that includes object detection as the base task, and a one-stage detector (e.g., FCOS) as the base detector. In some cases, a teacher formation process is used that includes multiscale training and crossing feature-level fusion. Then, the crossing feature-level knowledge distillation guides the training of a low-resolution student based on the teacher network.

Runtime efficiency may be increased by reducing input resolution for instance-level detection tasks (e.g., object detection). However, reduction in input resolution may affect detection performance. The present disclosure describes systems and methods for increasing performance of low-resolution models by distilling knowledge from a high-resolution or multi-resolution model. In some cases, knowledge distillation is applied to teacher and student networks that act on different input resolutions. Embodiments of the present disclosure include spatial arrangement of feature maps between models of varying input resolutions.

According to some embodiments, image processing apparatus 110 may be implemented on a server. A server provides one or more functions to users linked by way of one or more of the various networks. In some cases, the server includes a single microprocessor board, which includes a microprocessor responsible for controlling all aspects of the server. In some cases, a server uses microprocessor and protocols to exchange data with other devices/users on one or more of the networks via hypertext transfer protocol (HTTP), and simple mail transfer protocol (SMTP), although other protocols such as file transfer protocol (FTP), and simple network management protocol (SNMP) may also be used. In some cases, a server is configured to send and receive hypertext markup language (HTML) formatted files (e.g., for displaying web pages). In various embodiments, a server comprises a general purpose computing device, a personal computer, a laptop computer, a mainframe computer, a supercomputer, or any other suitable processing apparatus.

A cloud 115 is a computer network configured to provide on-demand availability of computer system resources, such as data storage and computing power. In some examples, the cloud 115 provides resources without active management by the user. The term "cloud" is sometimes used to describe data centers available to many users over the Internet. Some large cloud networks have functions distributed over multiple locations from central servers. A server is designated an edge server if it has a direct or close connection to a user 100. In some cases, a cloud 115 is limited to a single organization. In other examples, the cloud 115 is available to many organizations. In one example, a cloud 115 includes a multi-layer communications network comprising multiple edge routers and core routers. In another example, a cloud 115 is based on a local collection of switches in a single physical location.

A database 120 is an organized collection of data. For example, a database 120 stores data, such as images, in a specified format known as a schema. A database 120 may be structured as a single database, a distributed database, multiple distributed databases, or an emergency backup database. In some cases, a database controller may manage data storage and processing in a database 120. In some cases, a user interacts with database controller. In other cases, database controller may operate automatically without user interaction.

Figure 2:
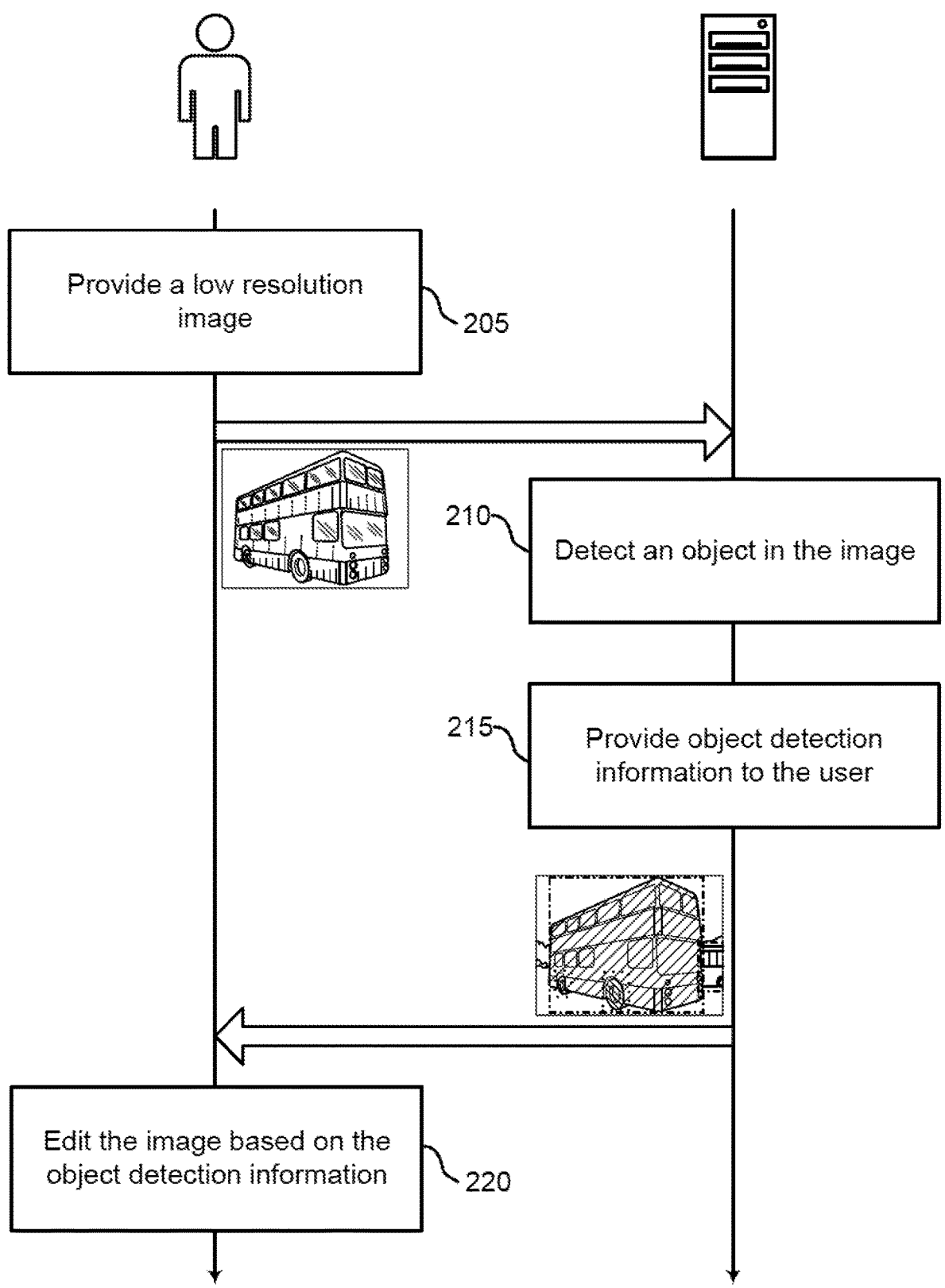
FIG. 2 shows an example of image editing according to aspects of the present disclosure.

FIG. 2 shows an example of a method of image editing according to aspects of the present disclosure. For example, the method may be performed by a user 100 interacting with an image processing apparatus 110 via a user device 105 as described with reference to FIG. 1.

At operation 205, the user provides a low resolution image. For example, the user can take a low-resolution photograph using a mobile device. In some cases, the operations of this step refer to, or may be performed by, a user as described with reference to FIG. 1.

At operation 210, the system detects an object in the image. The object can be detected using a student network that is trained to recognize objects in a low-resolution image based on knowledge distilled from a teacher network trained on high resolution images. In some cases, the operations of this step refer to, or may be performed by, an image processing apparatus as described with reference to FIG. 1.

At operation 215, the system provides object detection information to the user. In some cases, the operations of this step refer to, or may be performed by, an image processing apparatus as described with reference to FIG. 1. Then, at operation 220, the user edits the image based on the object detection information. For example, the user can edit a low-resolution image using an image editing app on a mobile device.

Architecture

Figure 3:
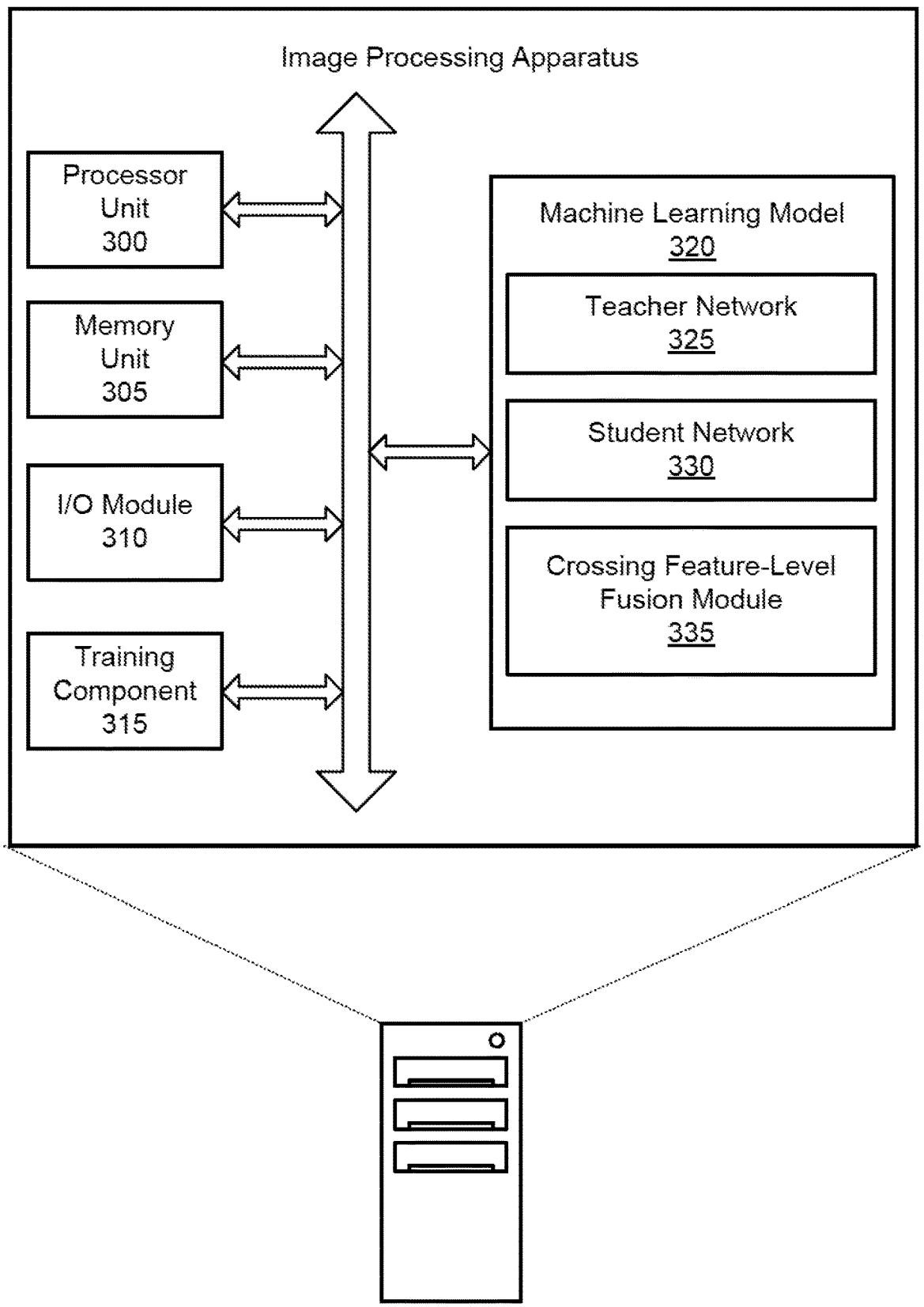
FIG. 3 shows an example of an image processing apparatus according to aspects of the present disclosure.
Figure 4:
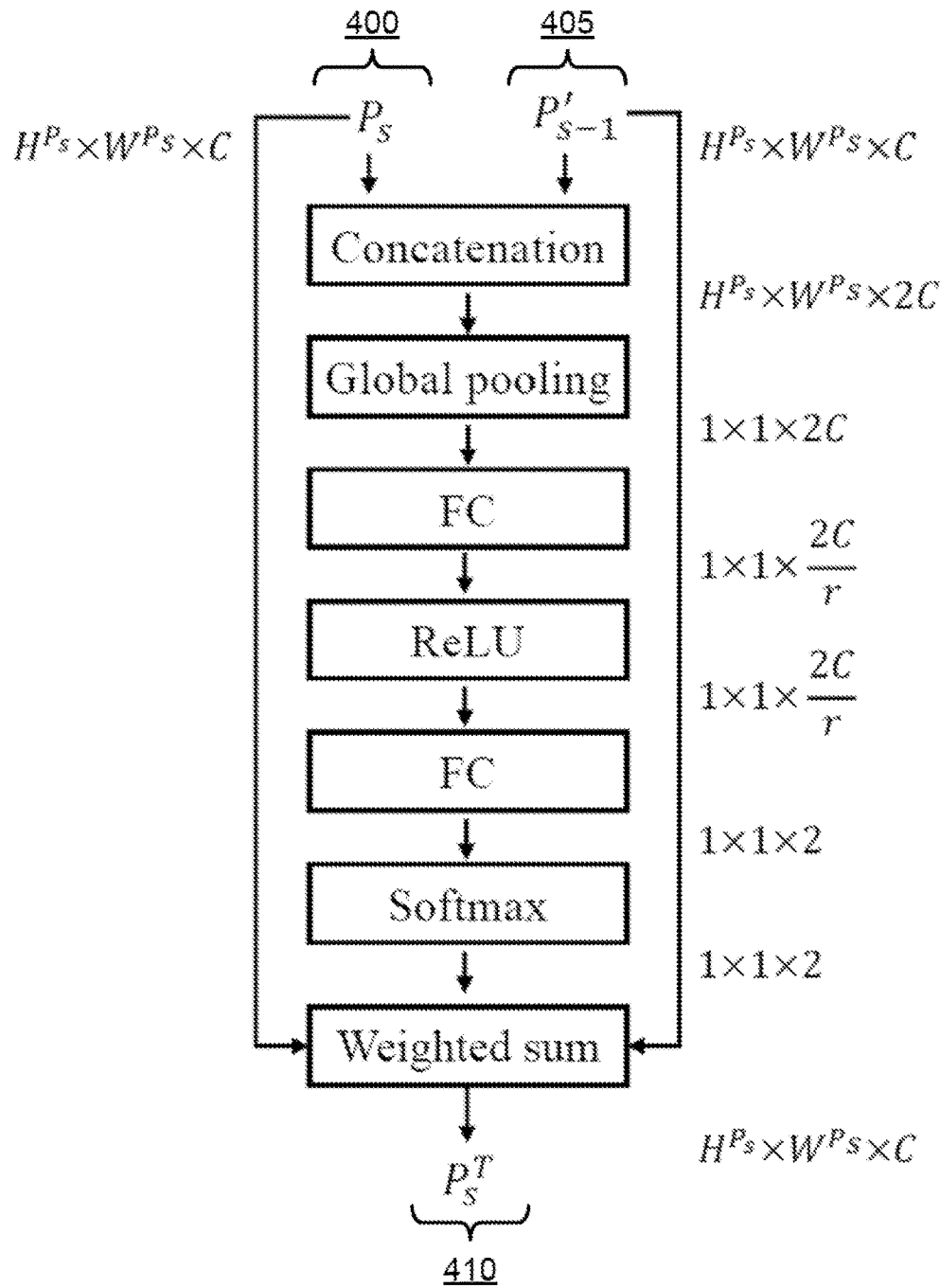
FIG. 4 shows an example of a crossing feature-level fusion module according to aspects of the present disclosure.

In FIGS. 3 and 4, an example of apparatus for image processing is described. One or more aspects of the apparatus include a high-resolution encoder of a teacher network configured to generate a first feature map based on a high-resolution version of a student training image; a low-resolution encoder of the teacher network configured to generate a second feature map based on a low-resolution version of the student training image; a crossing feature-level fusion module of the teacher network configured to generate a fused feature map based on the first feature map and the second feature map; and an encoder of a student network configured to generate a third feature map based on the low-resolution version of the student training image, wherein the encoder of the student network is trained using a knowledge distillation (KD) loss based on a comparison of the third feature map from the student network and the fused feature map from the teacher network.

Some examples of the apparatus, system, and method further include a decoder of the teacher network configured to generate prediction information based on an output of the crossing feature-level fusion module. Some examples of the apparatus, system, and method further include a decoder of the student network configured to decode the third feature map to obtain prediction information for the low-resolution version of the student training image.

In some aspects, the high-resolution encoder of the teacher network comprises a feature pyramid network (FPN) and the low-resolution encoder of the teacher network comprises an FPN with fewer levels than those of the high-resolution encoder of the teacher network. In some aspects, the encoder of the student network comprises a same number of levels as those of the low-resolution encoder of the teacher network. In some aspects, the first feature map is output from a third level of the high-resolution encoder of the teacher network and the second feature map is output from a second level of the low-resolution encoder of the teacher network, and the second level being lower than the third level.

FIG. 3 shows an example of an image processing apparatus according to aspects of the present disclosure. The example shown includes processor unit 300, memory unit 305, I/O module 310, training component 315, and machine learning module 320.

A processor unit 300 may include an intelligent hardware device, (e.g., a general-purpose processing component, a digital signal processor (DSP), a central processing unit (CPU), a graphics processing unit (GPU), a microcontroller, an application specific integrated circuit (ASIC), a field programmable gate array (FPGA), a programmable logic device, a discrete gate or transistor logic component, a discrete hardware component, or any combination thereof). In some cases, the processor unit 300 is configured to operate a memory array using a memory controller. In other cases, a memory controller is integrated into the processor unit 300. In some cases, the processor unit 300 is configured to execute computer-readable instructions stored in a memory to perform various functions. In some embodiments, a processor unit 300 includes special purpose components for modem processing, baseband processing, digital signal processing, or transmission processing.

Examples of a memory unit 305 include random access memory (RAM), read-only memory (ROM), or a hard disk. Examples of memory unit 305 include solid state memory and a hard disk drive. In some examples, memory unit 305 is used to store computer-readable, computer-executable software including instructions that, when executed, cause a processor to perform various functions described herein. In some cases, the memory unit 305 contains, among other things, a basic input/output system (BIOS) which controls basic hardware or software operation such as the interaction with peripheral components or devices. In some cases, a memory controller operates memory cells. For example, the memory controller can include a row decoder, column decoder, or both. In some cases, memory cells within a memory unit 305 store information in the form of a logical state.

An I/O module 310 may include a controller configured to manage input and output signals for a device. I/O controller may also manage peripherals not integrated into a device. In some cases, an I/O controller may represent a physical connection or port to an external peripheral. In some cases, an I/O controller may utilize an operating system such as iOS®, ANDROID®, MS-DOS®, MS-WINDOWS®, OS/2®, UNIX®, LINUX®, or another known operating system. In other cases, an I/O controller may represent or interact with a modem, a keyboard, a mouse, a touchscreen, or a similar device. In some cases, an I/O controller may be implemented as part of a processor. In some cases, a user may interact with a device via an I/O controller or via hardware components controlled by an I/O controller.

In one aspect, machine learning model 320 includes teacher network 325, student network 330, and crossing feature-level fusion module 335. In some embodiments, the machine learning model 320 comprises an artificial neural network (ANN). An ANN is a hardware or a software component that includes a number of connected nodes (i.e., artificial neurons), which loosely correspond to the neurons in a human brain. Each connection, or edge, transmits a signal from one node to another (like the physical synapses in a brain). When a node receives a signal, it processes the signal and then transmits the processed signal to other connected nodes. In some cases, the signals between nodes comprise real numbers, and the output of each node is computed by a function of the sum of its inputs. Each node and edge is associated with one or more node weights that determine how the signal is processed and transmitted.

During the training process, these weights are adjusted to increase the accuracy of the result (i.e., by minimizing a loss function which corresponds in some way to the difference between the current result and the target result). The weight of an edge increases or decreases the strength of the signal transmitted between nodes. In some cases, nodes have a threshold below which a signal is not transmitted at all. In some examples, the nodes are aggregated into layers. Different layers perform different transformations on their inputs. The initial layer is known as the input layer and the last layer is known as the output layer. In some cases, signals traverse certain layers multiple times.

In some embodiments, the machine learning model 320 includes a convolutional neural network (CNN). A CNN is a class of neural network that is commonly used in computer vision or image classification systems. In some cases, a CNN may enable processing of digital images with minimal pre-processing. A CNN may be characterized by the use of convolutional (or cross-correlational) hidden layers. These layers apply a convolution operation to the input before signaling the result to the next layer. Each convolutional node may process data for a limited field of input (i.e., the receptive field). During a forward pass of the CNN, filters at each layer may be convolved across the input volume, computing the dot product between the filter and the input. During the training process, the filters may be modified so that they are activated when they detect a particular feature within the input.

In some embodiments, the machine learning model 320 includes a feature pyramid network (FPN). An FPN is a feature extractor that generates multiple feature map layers (multi-scale feature maps) for object detection. Each feature map layer corresponds to a different resolution. That is, each layer of the feature pyramid represents the image feature using an array with a different number of values.

Training component 315 can be used to train the teacher network 325 and the student network 330. According to some aspects, training component 315 receives a high-resolution version of a student training image and a low-resolution version of the student training image. In some examples, training component 315 computes a KD loss based on a comparison of a feature map (e.g., a third feature map) from the student network 330 and a fused feature map from the teacher network 325. In some examples, training component 315 updates parameters of the student network 330 based on the KD loss. In some examples, training component 315 compares each of a set of fused feature maps to a corresponding feature map of the set of student training feature maps to obtain the KD loss.

In some examples, training component 315 computes a detection loss based on prediction information of the student network 330, and the parameters of the student network 330 are updated based on the detection loss. In some examples, training component 315 receives a high-resolution version of a teacher training image and a low-resolution version of the teacher training image. In some examples, training component 315 computes a teacher detection loss based on the teacher prediction information. In some examples, training component 315 updates parameters of the teacher network 325 based on the teacher detection loss. In some examples, training component 315 computes an arrangement loss based on the high-resolution prediction information and the low-resolution prediction information, where the parameters of the teacher network 325 are updated based on the arrangement loss.

According to some aspects, crossing feature-level fusion module 335 generates a fused feature map based on a first feature map and a second feature map of the teacher network 325 using a crossing feature-level fusion module 335. In some examples, each of the set of fused feature maps includes a different resolution level. In some examples, crossing feature-level fusion module 335 concatenates the first teacher training feature map and the second teacher training feature map along a channel dimension to obtain a concatenated teacher training feature map, where the fused teacher training feature map is generated based on the concatenated teacher training feature map. Crossing feature-level fusion module 335 is an example of, or includes aspects of, the corresponding element described with reference to FIG. 4.

The described methods may be implemented or performed by devices that include a general-purpose processor, a digital signal processor (DSP), an application specific integrated circuit (ASIC), a field programmable gate array (FPGA) or other programmable logic device, discrete gate or transistor logic, discrete hardware components, or any combination thereof. A general-purpose processor may be a microprocessor, a conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Thus, the functions described herein may be implemented in hardware or software and may be executed by a processor, firmware, or any combination thereof. If implemented in software executed by a processor, the functions may be stored in the form of instructions or code on a computer-readable medium.

Computer-readable media includes both non-transitory computer storage media and communication media including any medium that facilitates transfer of code or data. A non-transitory storage medium may be any available medium that can be accessed by a computer. For example, non-transitory computer-readable media can comprise random access memory (RAM), read-only memory (ROM), electrically erasable programmable read-only memory (EEPROM), compact disk (CD) or other optical disk storage, magnetic disk storage, or any other non-transitory medium for carrying or storing data or code.

Also, connecting components may be properly termed computer-readable media. For example, if code or data is transmitted from a website, server, or other remote source using a coaxial cable, fiber optic cable, twisted pair, digital subscriber line (DSL), or wireless technology such as infrared, radio, or microwave signals, then the coaxial cable, fiber optic cable, twisted pair, DSL, or wireless technology are included in the definition of medium. Combinations of media are also included within the scope of computer-readable media.

FIG. 4 shows an example of a crossing feature-level fusion module according to aspects of the present disclosure. The example shown includes high-resolution feature map 400, low-resolution feature map 405, and fused feature map 410.

According to one embodiment, the high-resolution feature map 400 and the low-resolution feature map 405 can be input to a machine learning model. First, the features maps are concatenated, and then global pooling is performed to obtain a single feature map. Then the single feature map is fed to a fully connected (FC) layer, then a rectified linear unit (ReLU), another fully connected layer, and then a softmax function. Finally, the output can be combined with a weighted sum of the high-resolution feature map 400 and the low-resolution feature map 405 to obtain the fused feature map 410.

In some cases, the crossing feature-level fusion module is extensible to fuse features in multiple resolutions. The fusion scores for a pair of feature maps are dynamically predicted and used to fuse or combine maps which share the same spatial sizes (e.g., $P_2$ and $P_3$ from low-resolution and high-resolution input with multiscale training).

The module can concatenate two feature maps along the channel dimension and performs global average pooling to obtain 1D contextual features of:

$$P_s^p = \frac{1}{H^{P_s} \times W^{P_s}} \sum_{i=1}^{H^{P_s}} \sum_{j=1}^{W^{P_s}} [P_s, P'_{s-m}](i, j) \quad (1)$$

where $s \in \{3, 4, 5, 6, 7\}$ is for levels or a feature pyramid network, P and P' are the pyramid feature maps of default- or high-resolution and low-resolution input images respectively. $H^{P_s}$ and $W^{P_s}$ are the height and width, respectively, of the feature map $P_s$. In some cases, two or multi-resolution students are fused with varying model complexity to counteract the loss of visual details used for small object detection.

Similarly, $P_s^p$ is fed to a multi-layer perceptron (MLP) denoted as $\mathcal{H}$ to obtain softmax-normalized fusion weights for the weighted sum that fuses the two feature maps:

$$P_s^T = h_s\{0\} \cdot P_s + h_s\{1\} \cdot P'_{s-m} \quad (2)$$

where $h_s = \mathcal{H}(P_s^p)$. $\mathcal{H}$ is a MLP that comprises a FC layer with $$\frac{2C}{r}$$

output channels (r is channel compression ratio), a ReLU function, a FC layer with 2 output channels, and softmax function. [·] indicates the concatenation operation for two feature maps along the channel dimension. {0} and {1} are the indexing mechanisms used to obtain the fusion scores for $P_s$ and $P'_{s-1}$ feature maps, respectively. In some cases, sigmoid function is applied that considers the output channels independently (i.e., multimodal distribution). Additionally or alternatively, softmax normalization may be used for a unimodal distribution among input of different resolutions.

Object Detection

Figure 5:
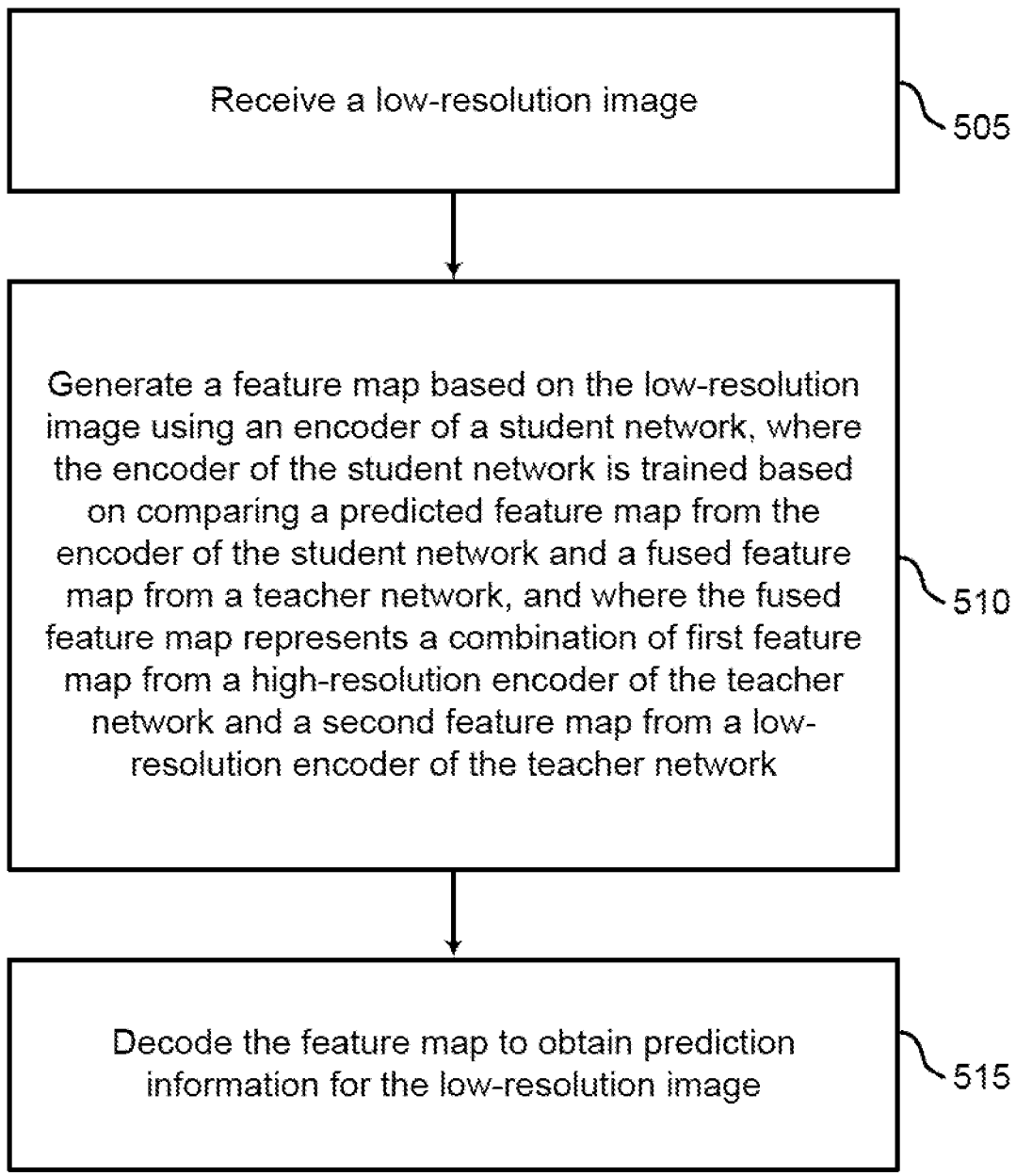
FIG. 5 shows an example of object detection according to aspects of the present disclosure.
Figure 6:
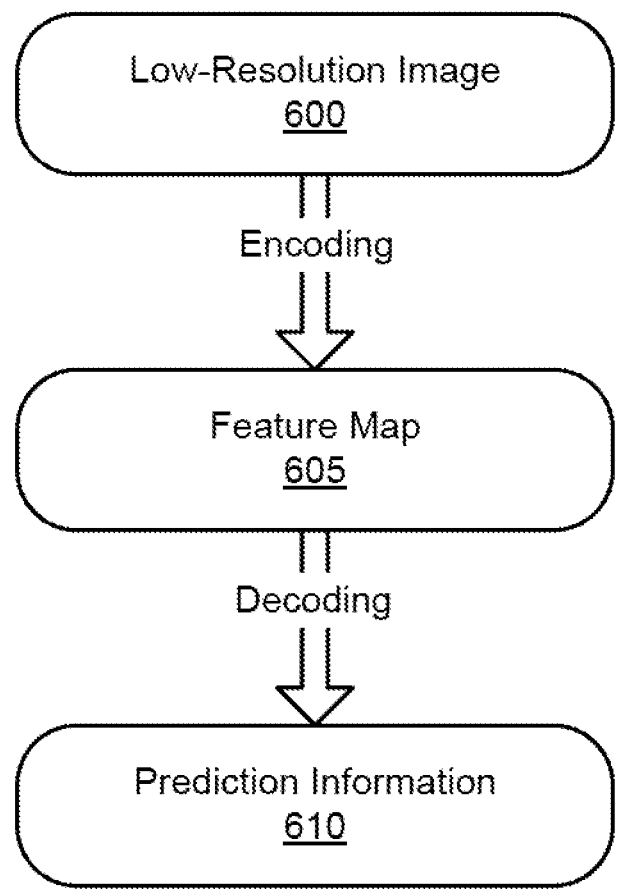
FIG. 6 shows an example of object detection diagram according to aspects of the present disclosure.

FIGS. 5 and 6 describe methods of object detection. Instance-level detection tasks, including object detection, instance segmentation, and key point detection, may depend on detecting objects at the instance level. An instance can be represented by a bounding box in object detection, a pixel-wise mask in instance segmentation, and a sequence of key points from the viewpoint of coarse-to-fine recognition. In some examples, single-shot instance-level detection methods and architectures can be used to accelerate model inference time while maintaining good detection performance. The present disclosure describes systems and methods to increase runtime efficiency while reducing input resolution without significant structural modification of the network.

For example, knowledge distillation can be used to train a compact network by distilling knowledge from a large teacher network. For example, knowledge distillation methods are used to perform distillation over spatial attention, intermediate features, relational representation, improved teachers, etc. Additionally, knowledge distillation methods may be used to increase the performance of a low-resolution model.

Accordingly, one or more embodiments of the object detection method include receiving a low-resolution image; generating a feature map based on the low-resolution image using an encoder of a student network, wherein the encoder of the student network is trained based on comparing a predicted feature map from the encoder of the student network and a fused feature map from a teacher network, and wherein the fused feature map represents a combination of first feature map from a high-resolution encoder of the teacher network and a second feature map from a low-resolution encoder of the teacher network; and decoding the feature map to obtain prediction information for the low-resolution image.

Some examples of the method, apparatus, non-transitory computer readable medium, and system further include generating a plurality of feature maps for the low-resolution image, wherein each of the plurality of feature maps comprises a different resolution level, and wherein the prediction information is generated based on the plurality of feature maps.

In some examples, the prediction information includes object classification information. In some examples, the prediction information includes object localization information. In some examples, the prediction information includes semantic segmentation information. In some examples, the prediction information includes instance-level semantic segmentation information.

FIG. 5 shows an example of object detection according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 505, the system receives a low-resolution image. In some cases, the operations of this step refer to, or may be performed by, an image processing apparatus as described with reference to FIG. 1. The term "low-resolution" refers to the relative number of pixels in an image. That is, a low-resolution image has fewer pixels than a high-resolution image. According to some embodiments of the present disclosure, learning from a machine learning model trained on high-resolution images can be transferred to a model that takes relatively low-resolution images as input (e.g., less than half as many pixels). For example, the teacher network can be trained using 800×800 pixel images and a student network can take 200×200 pixel images as input.

At operation 510, the system generates a feature map based on the low-resolution image using an encoder of a student network, where the encoder of the student network is trained based on comparing a predicted feature map from the encoder of the student network and a fused feature map from a teacher network, and where the fused feature map represents a combination of first feature map from a high-resolution encoder of the teacher network and a second feature map from a low-resolution encoder of the teacher network. In some cases, the operations of this step refer to, or may be performed by, a student network encoder as described with reference to FIG. 9. In some examples, the student network encoder comprises a CNN-based FPN.

An example of a process for training the teacher network is described with reference to FIG. 7. An example of a process for training the student network is provided with reference to FIG. 8. FIG. 9 shows a diagram including both an example of a teacher network and an example of a student network, along with a crossing feature level fusion model for combining different feature maps of the teacher network.

At operation 515, the system decodes the feature map to obtain prediction information for the low-resolution image. In some cases, the operations of this step refer to, or may be performed by, a student network decoder as described with reference to FIG. 9.

FIG. 6 shows an example of an object detection diagram according to aspects of the present disclosure. The example shown includes low-resolution image 600, feature map 605, and prediction information 610. In some cases, the object detection may include instance detection, instance segmentation, and human key-point detection.

The low-resolution image 600 is encoded (e.g., using a student network encoder) to obtain a feature map 605. The feature map 605 can then be decoded (e.g., using a decoder of a student network) to obtain prediction information 610 such as object labels and bounding box information. In one example, the multi-scale distillation framework is based on FCOS, where an FPN backbone and a detection head perform pixel-level box prediction and regression to achieve object detection.

In some embodiments, only the student network is used at inference time, and the teacher network is only used for knowledge distillation from teacher to student. Thus, low-resolution images can be processed using a relatively low complexity machine learning model while achieving accuracy comparable to that of a high complexity model that takes high-resolution images as input.

In some cases, an FPN backbone utilizes a feature pyramid scheme to compute features at multiple scales for detecting objects of different sizes. Additionally, FPN backbone extracts feature maps $P_s \in \mathbb{R}^{H^{P_s} \times W^{P_s} \times 256}$ of multiple resolutions at different FPN levels from the input image $I \in \mathbb{R}^{H \times W \times 3}$, where H and W denote the height and width of the image respectively. $H^{P_s}$, $W^{P_s}$ refer to height and width of FPN feature maps, where s indexes the level of the multi-scale feature maps generated by FPN. In some examples, the FPN feature maps may be spatially smaller than the input image by factors of $\{4, 8, 16, 32, 64, 128\}$ and $s \in \{2, 3, 4, 5, 6, 7\}$.

The detection head includes two output branches, i.e., a classification branch and a regression branch. Additionally, the branches include four convolutional blocks with convolutional layers and rectified linear unit (ReLU) layers. The blocks are shared among FPN levels from $P_2$ to $P_7$. In some cases, FPN features use the detection head to perform instance-level classification and box regression.

Training and Evaluation

Embodiments of the present disclosure include a multi-scale training method and a crossing feature-level fusion module to train a strong teacher for object detection. In some cases, the multi-scale training provides a ready-for-distillation robust teacher that works across multiple input resolutions. Additionally, the crossing feature-level fusion module dynamically fuses the features from multiple-resolution models within the same teacher network. The multi-scale and multi-resolution knowledge of the multi-scale fusion teacher is distilled to the low-resolution student, which results in a high performing low-resolution model. This provides informative training signals to the low-resolution student that does not have access to high quality visual details in high-resolution images.

Multi-scale training can be used in image classification and object detection to increase model robustness against input resolution variation. Additionally, multi-scale training is used to increase performance at multiple or low input resolutions. Conventional multi-scale training does not involve knowledge distillation and thus does not guarantee the existence of features required for knowledge distillation in instance-level detection. In some cases, knowledge distillation is applied to enhance low-resolution image classification with multi-scale training since multi-resolution models share the same output size. However, application of knowledge distillation may not be possible for instance-level detection. As a result, a multi-scale training method is used for application of knowledge distillation.

A high-resolution model may be used for small object detection due to increased preservation of fine visual details in high-resolution images. Similarly, a low-resolution model may be used for large object detection, as the backbone network captures information on the larger portions of the whole image. In some cases, use of multi-scale training provides a robust network against multiple input resolutions. Additionally, the network runs on one input resolution during inference which results in low incorporation of predicted features from high- and low-resolution models.

Embodiments of the disclosure include a feature fusion module to dynamically fuse pyramidal feature maps from different resolution input in an input-dependent manner. In some cases, the feature fusion module enables the network to adjust the degrees of contributions from different resolution input, depending on the content of the input image.

An embodiment of the disclosure includes results of using different backbone architectures and network widths to train teacher-student pairs using the multi-scale fusion framework. In some embodiments, teacher and student networks share the same backbone and a multi-scale fusion teacher may be used to train a high-resolution student. In some examples, a low-resolution student (i.e., ResNeXt-101) may outperform a high-resolution student (i.e., ResNet-50) using less computational footprint (i.e., microprocessor speed). For example, the low-resolution student may provide similar performance on an object detection task using half the floating point operations per second (i.e., FLOPs) as used by a high-resolution student. The multi-scale fusion framework works with slim or compact pre-trained backbones at multiple network widths. Additionally, the framework uses a backbone for the teacher network.

In some embodiments, multiple model compression techniques are used to train compact models for accelerated inference which focus on trimming networks along depth or width, or adopting efficient block structure design. In some cases, input resolution is used for compound scaling of network architectures. However, in conventional systems reducing input resolutions to accelerate instance-level detection decreases performance. For example, in a fully convolutional one-stage object detector (i.e., FCOS), the mean average precision (AP) decreases from 38.7 to 34.6 when the detector is trained on 400 pixel images instead of the default 800 pixel images.

Embodiments of the present disclosure include training methods that increases performance of a low-resolution detection model. For example, the performance of a low-resolution model may be equal or nearly equal to the performance of a corresponding high-resolution model.

According to embodiments of the present disclosure, the performance loss due to using low-resolution input can be reduced by distilling knowledge from a high-resolution teacher network to a low-resolution student network. Knowledge distillation methods distill knowledge from a large teacher network to a compact student network in the context of image classification. As a result, spatial scales of final output of the teacher and student networks are identical.

However, in case of instance-level detection, application of knowledge distillation to high-resolution teacher and low-resolution student networks may not be possible since the teacher and student networks do not share the same feature or output spatial size at the same network stages. In some examples, feature maps and output of the pre-trained large-resolution teacher network are down-sampled to match the feature maps and output of the low-resolution student network. However, down-sampling significantly affects predicted features and output which inaccurately indicates the actual knowledge learned by the teacher.

Embodiments of the present disclosure can resolve output size mismatch between high-resolution teacher and low-resolution student networks. In some cases, the feature map size in the last network stage is larger than the feature map size of the current stage. In some examples, the feature map size in last network stage may be two times of the current stage for feature pyramid (FPN) structure used in instance-level detection networks. As a result, an input resolution which is two times smaller than an input for the teacher network is used for a low-resolution student. In some examples, use of a small input resolution provides feature-level consistency between the two input resolution models. Additionally, a small resolution provides for spatial match of teacher and student features resulting in fast and effective knowledge distillation from teacher to student network. For example, the spatial size of $P_2$ with low-resolution input (i.e., down-sampled by 2 times) shares the same spatial size as $P_3$ of the high-resolution input.

Accordingly, methods for training a machine learning model as described in FIG. 3 are described. One or more embodiments of the method include receiving a high-resolution version of a student training image and a low-resolution version of the student training image; generating a first feature map based on the high-resolution version of the student training image using a high-resolution encoder of a teacher network; generating a second feature map based on the low-resolution version of the student training image using a low-resolution encoder of the teacher network; generating a fused feature map based on the first feature map and the second feature map using a crossing feature-level fusion module of the teacher network; generating a third feature map based on the low-resolution version of the student training image using an encoder of a student network; computing a KD loss based on a comparison of the third feature map from the student network and the fused feature map from the teacher network; and updating parameters of the student network based on the KD loss.

Some examples of the method, apparatus, non-transitory computer readable medium, and system further include generating prediction information for an object in the student training image. Some examples further include computing a detection loss based on the prediction information, wherein the parameters of the student network are updated based on the detection loss.

Some examples of the method, apparatus, non-transitory computer readable medium, and system further include generating a plurality of fused feature maps using the teacher network, wherein each of the plurality of fused feature maps comprises a different resolution level. Some examples further include generating a plurality of student training feature maps using the student network. Some examples further include comparing each of the plurality of fused feature maps to a corresponding feature map of the plurality of student training feature maps to obtain the KD loss.

Some examples of the method, apparatus, non-transitory computer readable medium, and system further include receiving a high-resolution version of a teacher training image and a low-resolution version of the teacher training image. Some examples further include generating a first teacher training feature map based on the high-resolution version of the teacher training image using a high-resolution encoder of the teacher network. Some examples further include generating a second teacher training feature map based on the low-resolution version of the teacher training image using a low-resolution encoder of the teacher network.

Some examples further include generating a fused teacher training feature map based on the first teacher training feature map and the second teacher training feature map using the crossing feature-level fusion module of the teacher network. Some examples further include generating teacher prediction information for an object in the teacher training image. Some examples further include computing a teacher detection loss based on the teacher prediction information. Some examples further include updating parameters of the teacher network based on the teacher detection loss.

Some examples of the method, apparatus, non-transitory computer readable medium, and system further include generating high-resolution prediction information using the high-resolution encoder of the teacher network. Some examples further include generating low-resolution prediction information using the low-resolution encoder of the teacher network. Some examples further include computing an arrangement loss based on the high-resolution prediction information and the low-resolution prediction information, wherein the parameters of the teacher network are updated based on the arrangement loss.

Some examples of the method, apparatus, non-transitory computer readable medium, and system further include concatenating the first teacher training feature map and the second teacher training feature map along a channel dimension to obtain a concatenated teacher training feature map, wherein the fused teacher training feature map is generated based on the concatenated teacher training feature map.

Some examples of the method, apparatus, non-transitory computer readable medium, and system further include computing a shift offset parameter based on a number of levels in the high-resolution encoder of the teacher network and a number of levels in the low-resolution encoder of the teacher network. Some examples further include arranging the first teacher training feature map and the second teacher training feature map based on the shift offset parameter.

Some examples of the method, apparatus, non-transitory computer readable medium, and system further include generating a first set of teacher training feature maps based on the high-resolution version of the teacher training image using the high-resolution encoder of the teacher network. Some examples further include generating a second set of teacher training feature maps based on the low-resolution version of the teacher training image using the low-resolution encoder of the teacher network. Some examples further include arranging each of the first set of teacher training feature maps to a corresponding feature map of the second set of teacher training feature maps based on the shift offset parameter.

Figure 7:
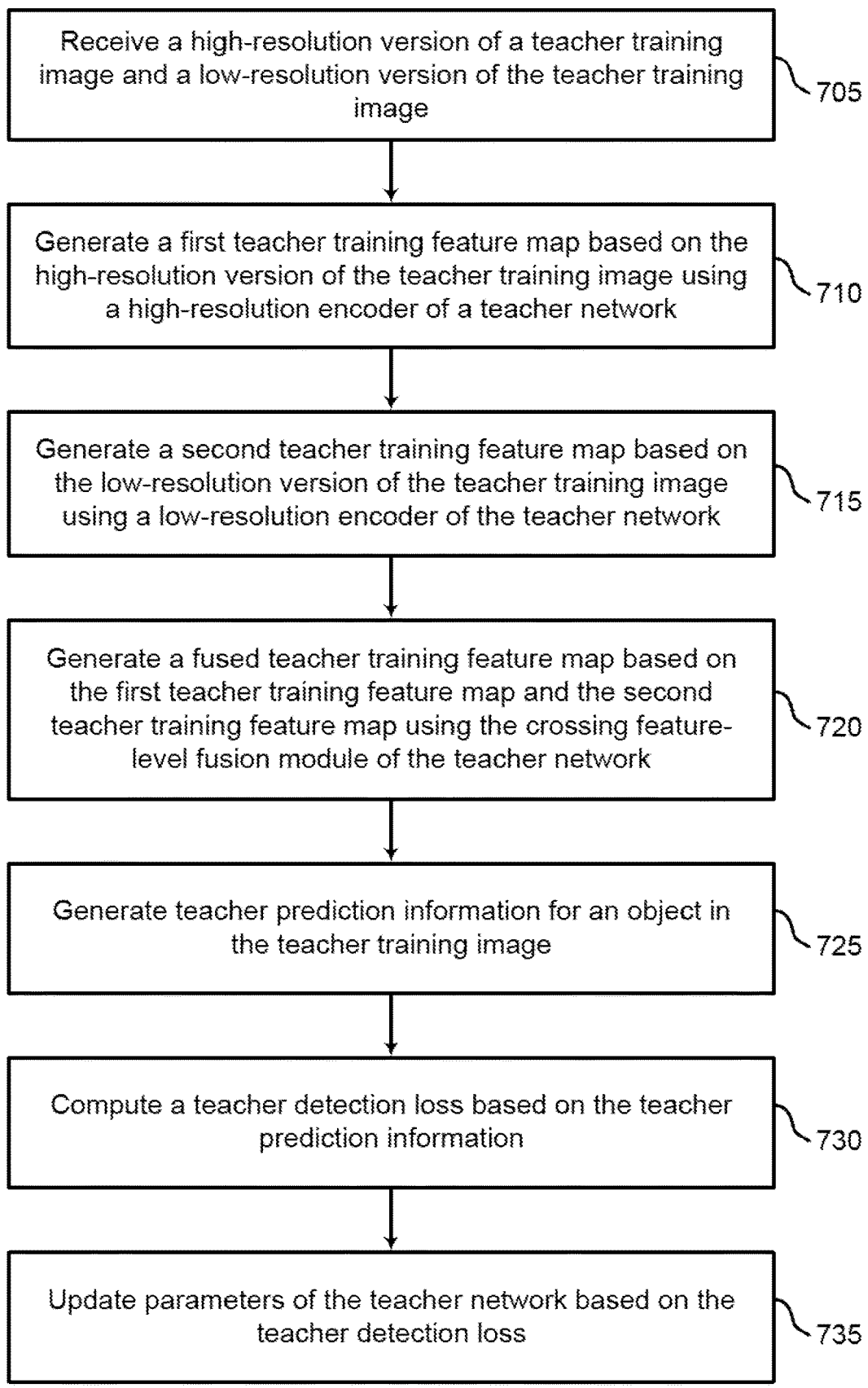
FIG. 7 shows an example of training a teacher network according to aspects of the present disclosure.

FIG. 7 shows an example of training a teacher network according to aspects of the present disclosure. Training of the teacher network can be performed by the training component 315 described in FIG. 3. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

The teacher network can be trained using a supervised learning model. Supervised learning is one of three basic machine learning paradigms, alongside unsupervised learning and reinforcement learning. Supervised learning is a machine learning technique based on learning a function that maps an input to an output based on example input-output pairs. Supervised learning generates a function for predicting labeled data based on labeled training data consisting of a set of training examples. In some cases, each example is a pair consisting of an input object (typically a vector) and a desired output value (i.e., a single value, or an output vector). A supervised learning algorithm analyzes the training data and produces the inferred function, which can be used for mapping new examples. In some cases, the learning results in a function that correctly determines the class labels for unseen instances. In other words, the learning algorithm generalizes from the training data to unseen examples.

Once the teacher network is trained, it can then be used to train a student network using a knowledge distillation process. Accordingly, knowledge distillation can be performed based on a strong teacher. Embodiments of the present disclosure include a framework that performs feature-level knowledge distillation. In some cases, the framework distills through the pyramidal features of FPN. Additionally, systems and methods are provided that train a teacher network to distill strong multi-resolution knowledge at feature level and guide the training of a low-resolution student network.

Additionally or alternatively, a multi-scale training strategy may be used to train a strong multi-scale teacher. Multi-scale training increases the performance of a teacher network at the network parameter or weight level. For example, the training strategy may implicitly incorporate multiscale information to the features of an input image at given single resolution. In some cases, crossing feature-level fusion is used to dynamically fuse two-resolution features generated by the same teacher network based on two input resolutions, which distills knowledge with enhanced multi-scale information to a low-resolution student network.

Multi-scale training may refer to training multiple models that act at different perturbed input resolutions and share the same network parameters or weights. For example, multi-scale training affects the base input resolution (H, W) by rescaling the resolution with a random scaling factor $\hat{\alpha}$ sampled from the range of $[\alpha_{min}, \alpha_{max}]$ (e.g., [0.8, 1.0]) at each training iteration. The high-resolution models have knowledge that can be distilled to low-resolution models within the same network. In some cases, knowledge distillation may be significant due to the spatial size mismatch between the output and feature maps of models acting at multiple input resolutions.

The spatial sizes of two adjacent pyramidal feature maps differ by two times along each spatial dimension in the FPN structure. For example, two base resolutions ((H, W), (H', W')) are adopted for high-resolution and low-resolution models that share the same network weights, where H'=H/k, W'=W/k. k is a valid even number that preserves the expected number of FPN levels in the model. The reduction factor corresponds to a shift in the position of FPN at backbone network. Additionally, the reduction factor obtains FPN pyramidal feature maps whose spatial sizes match the sizes of a high-resolution model.

The shift offset can be denoted as m, where m=k/2. A low-resolution (i.e., k=2 and m=1) model outputs pyramidal feature maps at $\{P'_2, P'_3, P'_4, P'_5, P'_6\}$ levels in a feature pyramid network that include the same spatial sizes as the default (i.e., $\{P_3, P_4, P_5, P_6, P_7\}$) levels of high-resolution model. High-resolution and low-resolution models can be trained simultaneously using multi-scale training with distinctly sampled $\hat{\alpha}$.

At operation 705, the system receives a high-resolution version of a teacher training image and a low-resolution version of the teacher training image. In some cases, the operations of this step refer to, or may be performed by, a training component as described with reference to FIG. 3.

At operation 710, the system generates a first teacher training feature map based on the high-resolution version of the teacher training image using a high-resolution encoder of a teacher network. In some cases, the operations of this step refer to, or may be performed by, a high-resolution encoder as described with reference to FIG. 9.

At operation 715, the system generates a second teacher training feature map based on the low-resolution version of the teacher training image using a low-resolution encoder of the teacher network. In some cases, the operations of this step refer to, or may be performed by, a low-resolution encoder as described with reference to FIG. 9.

At operation 720, the system generates a fused teacher training feature map based on the first teacher training feature map and the second teacher training feature map using the crossing feature-level fusion module of the teacher network. In some cases, the operations of this step refer to, or may be performed by, a crossing feature-level fusion module as described with reference to FIGS. 3 and 9.

At operation 725, the system generates teacher prediction information for an object in the teacher training image. In some cases, the operations of this step refer to, or may be performed by, a teacher network decoder as described with reference to FIG. 9.

At operation 730, the system computes a teacher detection loss based on the teacher prediction information. In some cases, the operations of this step refer to, or may be performed by, a training component as described with reference to FIG. 3.

In one embodiment, an FPN is trained with a loss function for an image with height H and width W based on the loss function as follows:

$$\mathcal{L}_{H \times W} = \mathcal{L}_{cls} + \mathcal{L}_{reg} + \mathcal{L}_{ctr} \quad (3)$$

where $\mathcal{L}_{cls}$ is the classification loss, $\mathcal{L}_{reg}$ is the bounding box regression loss, and $\mathcal{L}_{ctr}$ is the centerness loss. In some cases, the term loss function refers to a function that impacts how a machine learning model is trained in a supervised learning model. Specifically, during each training iteration, the output of the model is compared to the known annotation information in the training data. The loss function provides a value for how close the predicted annotation data is to the actual annotation data. After computing the loss function, the parameters of the model are updated accordingly and a new set of predictions are made during the next iteration.

In some examples, fused features, $P_s^T$ can fed to the detection head with multi-scale information for either training or inference. Given $P_s^T$, the training loss can be defined as follows:

$$\mathcal{L}_F = \lambda \cdot \mathcal{L}_{(H \& H') \times (W \& W')} \quad (4)$$

where (H&H')×(W&W') indicates the use of the fused features from high- and low-resolution images. Moreover, λ is the loss weight.

In some cases, the low-resolution model uses network blocks that generate pyramidal features to spatially match pyramidal features of the high-resolution model. The models are trained using low-resolution input (obtained by varying k) arranged together with a high-resolution model (i.e., in terms of pyramidal feature map sizes). The arrangement of multiple resolution levels can eliminate feature-size inconsistency between models of multiple input resolutions and is used for crossing-resolution knowledge distillation. The multi-scale training loss can be defined as follows:

$$\mathcal{L}_{Align} = \mathcal{L}_{H \times W} + \mathcal{L}_{H' \times W'} \qquad (5)$$

where $\mathcal{L}_{H \times W}$ and $\mathcal{L}_{H' \times W'}$ are losses for default, i.e., high-resolution and low-resolution input, respectively. In some cases, one low-resolution (H'×W') model may be included in the loss function. The multi-scale training may be extended to include multiple low-resolution models.

In some cases, the fused model is used as the multi-scale teacher to guide the training of low-resolution student since fused multi-scale features are stronger than single-scale features from high-resolution or low-resolution inputs. The fused multiscale teacher is obtained by training with a two-step strategy, where the first stage performs multi-scale training, and the second stage trains the fusion module while "freezing" the FPN and detection head (i.e., FPN and detection head are kept constant). Alternatively, end-to-end training is performed with joint multi-scale training with feature fusion losses represented as follows:

$$\mathcal{L}_T = \mathcal{L}_{Align} + \mathcal{L}_F \qquad (6)$$

At operation 735, the system updates parameters of the teacher network based on the teacher detection loss. In some cases, the operations of this step refer to, or may be performed by, a training component as described with reference to FIG. 3.

The effect of different teacher variants can impact the performance of low-resolution students. For example, strong teachers produce strong students and multi-scale fusion teachers produce students with high strength. In some cases, multi-scale fusion teachers have high compatibility with low-resolution students due to the inclusion of features of low-resolution model in the feature fusion process. Feature-level distillation methods can outperform conventional output-level knowledge distillation since intermediate features are informative.

Figure 8:
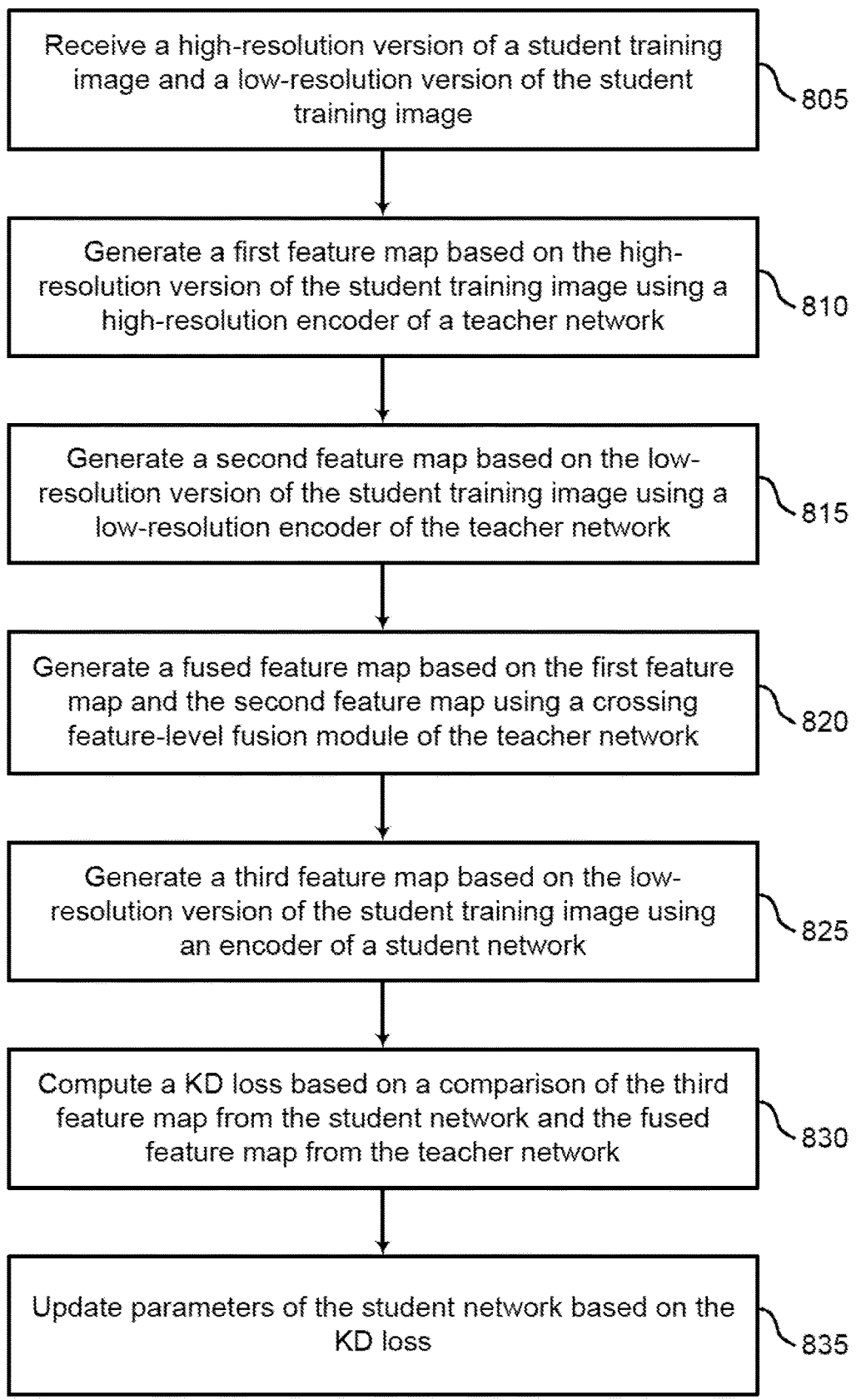
FIG. 8 shows an example of training a student network according to aspects of the present disclosure.
Figure 9:
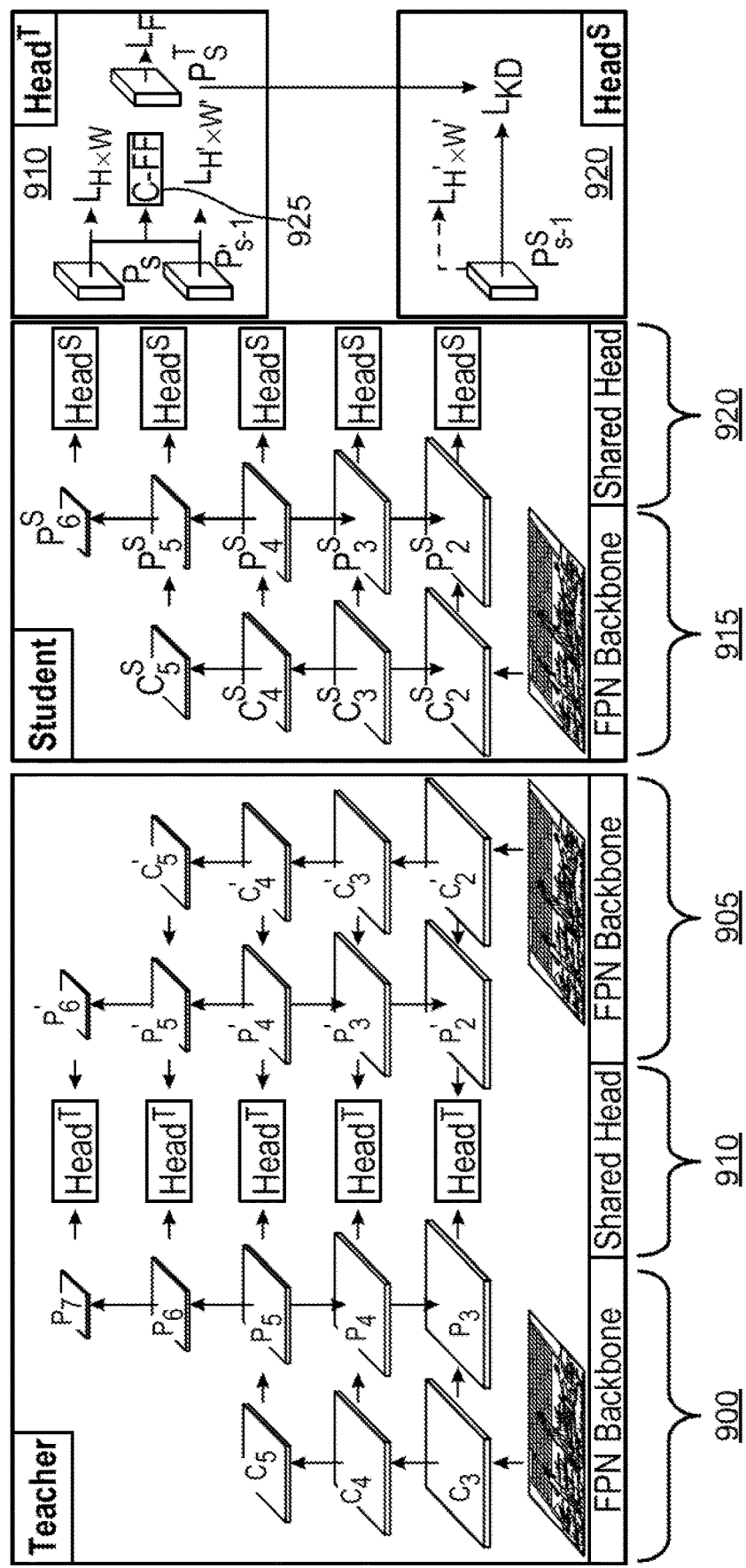
FIG. 9 shows an example of multi-scale distillation network training according to aspects of the present disclosure.

FIG. 8 shows an example of training a student network according to aspects of the present disclosure. Training of the student network can be performed by the training component 315 described in FIG. 3. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 805, the system receives a high-resolution version of a student training image and a low-resolution version of the student training image. In some cases, the operations of this step refer to, or may be performed by, a training component as described with reference to FIG. 3.

At operation 810, the system generates a first feature map based on the high-resolution version of the student training image using a high-resolution encoder of a teacher network. In some cases, the operations of this step refer to, or may be performed by, a high-resolution encoder as described with reference to FIG. 9.

At operation 815, the system generates a second feature map based on the low-resolution version of the student training image using a low-resolution encoder of the teacher network. In some cases, the operations of this step refer to, or may be performed by, a low-resolution encoder as described with reference to FIG. 9.

At operation 820, the system generates a fused feature map based on the first feature map and the second feature map using a crossing feature-level fusion module of the teacher network. In some cases, the operations of this step refer to, or may be performed by, a crossing feature-level fusion module as described with reference to FIGS. 3 and 9.

At operation 825, the system generates a third feature map based on the low-resolution version of the student training image using an encoder of a student network. In some cases, the operations of this step refer to, or may be performed by, a student network encoder as described with reference to FIG. 9.

At operation 830, the system computes a KD loss based on a comparison of the third feature map from the student network and the fused feature map from the teacher network. In some cases, the operations of this step refer to, or may be performed by, a training component as described with reference to FIG. 3.

At operation 835, the system updates parameters of the student network based on the KD loss. In some cases, the operations of this step refer to, or may be performed by, a training component as described with reference to FIG. 3.

In some embodiments, the model generates a strong multi-scale fusion teacher with multi-scale training and crossing feature-level fusion. In some embodiments, multi-resolution features can be distilled to the low-resolution student. High resolution and input resolution may be denoted as H×W and H'×W' used by the teacher and student networks, respectively. Knowledge is distilled from features of the teacher $P_s^T$ to features of the student $P_{s-m}^S$ via L1 loss as follows:

$$\mathcal{L}_{KD} = \tau \cdot \sum_s |P_s^T - P_{s-m}^S| \qquad (7)$$

where T and S refer to teacher and student, s is the pyramidal feature level (e.g., 3 to 7 for default input resolution in an FPN) of the teacher, m is the shift offset used to spatially arrange feature maps of student and teacher, and τ is the loss weight hyperparameter. The student is trained with both knowledge distillation loss and original detection loss, weighted by γ as follows:

$$\mathcal{L}_S = \gamma \cdot \mathcal{L}_{KD} + (1-\gamma) \cdot \mathcal{L}_{H' \times W'} \qquad (8)$$

An embodiment of the disclosure evaluates the influence of the loss balancing weights on student performance. For example, γ is used in student training by balancing knowledge distillation and original detection losses. Similarly, τ can be tuned after γ is fixed.

FIG. 9 shows an example of multi-scale distillation network training according to aspects of the present disclosure. The example shown includes high-resolution encoder 900, low-resolution encoder 905, teacher network decoder 910, student network encoder 915, student network decoder 920, and crossing feature-level fusion module 925.

According to some embodiments, high-resolution encoder 900 of a teacher network generates a first feature map based on the high-resolution version of the student training image. Low-resolution encoder 905 of the teacher network generates a second feature map based on the low-resolution version of the student training image. In some aspects, the high-resolution encoder 900 of the teacher network includes an FPN and the low-resolution encoder 905 of the teacher network includes an FPN with fewer levels than those of the high-resolution encoder 900 of the teacher network. In some examples, teacher network decoder 910 generates teacher prediction information.

In some cases, the feature map output of the high-resolution encoder 900 and low-resolution encoder 905 is used for distilling knowledge from the teacher network to the student network. According to some embodiments, student network encoder 915 generates a feature map based on a low-resolution image. The student network encoder 915 is trained based on comparing a predicted feature map from the encoder of the student network and a fused feature map from a teacher network. The fused feature map represents a combination of first feature map from a high-resolution encoder 900 and a second feature map from a low-resolution encoder 905. In some examples, student network encoder 915 generates a set of feature maps for the low-resolution image, where each of the set of feature maps includes a different resolution level. In some embodiments, the encoder of a student network (i.e., student network encoder 915) includes a same number of levels as the low-resolution encoder 905 of the teacher network.

According to some embodiments, student network decoder 920 decodes the feature map to obtain prediction information for the low-resolution image. In some examples, the prediction information includes object classification information, object localization information, semantic segmentation information, and instance-level semantic segmentation information.

The crossing feature-level fusion module 925 generates a fused feature map based on an output of the high-resolution encoder 900 and low-resolution encoder 905. The crossing feature-level fusion module 925 is an example of, or includes aspects of, the corresponding element described with reference to FIG. 3.

Thus, a multi-scale training technique can be used to train a multi-scale teacher that can distill knowledge to a low-resolution student. A crossing feature-level fusion is used to dynamically fuse multi-resolution features of a teacher to enhance guidance to the student. Trained low-resolution models are developed that perform competitively with high-resolution models on multiple instance-level detection tasks and datasets. In some cases, models are trained using conventional multi-scale training. For example, trained low-resolution models outperform conventional low-resolution models by 2.1% to 3.6% in terms of mean average precision (mAP).

A comparison of the performance of embodiments of the present disclosure may be performed using an object detection and segmentation dataset (i.e., COCO dataset) that include 115,000 training images and report evaluation results. In some cases, the images and results are used on 5,000 validation images for ablation experiments. Additionally, results on 20,000 test and development images are provided using average precision metrics (AP). In some examples, intersection over union (IoU) or Jaccard index range of 0.5:0.95:0.05, $AP_{50}$ (i.e., IoU=0.5 to count as positive), $AP_{75}$ (i.e., IoU=0.75 to count as positive), $AP_S$ (small-sized objects), $AP_M$ (medium-sized objects), and $AP_L$ (large-sized objects) may be obtained. In some cases, $AP^{T_1}$ is specified for the teacher with multi-scale training, $AP^{T_2}$ is specified for the multi-scale fusion teacher, and $AP^S$ is specified for the student.

Ablation experiments may be conducted with a one-stage object detection model (i.e., FCOS) using a neural network (i.e., ResNet-50 backbone). Additionally, an evaluation is performed on a dense object detection method (i.e., Retina-Net) and on instance-level tasks, for example, instance segmentation and keypoint detection (i.e., Mask R-CNN). For example, a teacher or student network may be trained using batch size 16 for 12 epochs (i.e., 90,000 iterations or 1 time schedule). In some cases, training may be done in ablation experiments using detection frameworks.

In some example, high resolution corresponds to a size of (800) and low resolution corresponds to a size of (400), the maximum of long side of an image. Additionally, $\alpha_{min}$ and $\alpha_{max}$ can be set to 0.8 and 1.0 respectively for multi-scale training. The two resolutions (height and length) are denoted as H and L.

In one example, a stochastic gradient descent (SGD) with learning rate 0.01 is used as the optimizer. The learning rate is decreased with 0.1 after κ and 11 epochs for 1 time training schedule and the epoch numbers are scaled proportionally for long training schedules. The teacher backbone networks are initialized with pretrained models, for example, visual object recognition database (i.e., ImageNet) may be used for pretraining. Teacher and student models share the same training setting. In some examples, single-scale low-resolution images are considered for the student.

Low-resolution students can share the same backbone architecture and can be initialized by a multi-resolution or high-resolution teacher. In some cases, hyperparameters are tuned. For example, λ, γ, and τ are set to 1.0, 0.2, and 3.0 respectively.

In one example, a teacher model trained with single-scale training achieves 38.6(H)/34.1(L) AP. Similarly, the model obtains 40.3(H)/35.9(L) AP with a multi-scale training using input of two base resolutions. The multi-scale training (i.e., with two base resolutions) enables the teacher model to achieve increased performance balance between H and L input resolutions. For example, the teacher model may achieve 40.1(L)/37.8(H) AP. In some cases, multi-scale training outperforms conventional multi-scale training by 1.9 AP on low-resolution input.

An embodiment of the disclosure includes using different feature fusion strategies to fuse features of multi-resolution teacher models. In some examples, models that use feature fusion outperform single-resolution non-fusion models due to the incorporation of multi-resolution information in the fused features. Additionally, the crossing feature-level fusion module 925 that fuses features with dynamic fusion weights outperforms models that fuse features with static weights.

In some cases, the effects of changing output activation function and generating channel-wise output (i.e., 1×1×2C) in a crossing feature-level fusion (C-FF) module 925 are evaluated. For example, substituting softmax activation in C-FF with sigmoid (i.e., in a squeeze and excitation module) reduces the AP by 0.9%. The softmax function increases the decisiveness of the module when selecting features from input resolutions. As a result, the features do not include insignificant resolutions. In some cases, the performance of the multi-scale fusion teacher using different training strategies (i.e., two-step and joint training strategies) and λ values are evaluated and performance results are recorded. For example, multi-scale fusion teacher uses λ=0.4.

The multi-scale fusion framework is applied to multiple instance-level detection tasks including object detection, instance detection, and key-point detection. For example, low-resolution models trained with the framework may outperform conventional vanilla multi-scale training method by 2.1% to 3.6%. Additionally, such low-resolution models may have similar performance as high-resolution models. In some examples, the performance of multiple backbone combinations are evaluated for multi-scale fusion students that use less computational footprints (i.e., FLOPS) compared to a full-width high-resolution model. For example, high performance may be seen on small-sized objects $AP_S^S$.

Accordingly, embodiments of the present disclosure include a framework that increases the performance on low-resolution instance-level detection tasks. The framework comprises multi-scale training and crossed feature-level fusion technique for training a teacher that dynamically fuses features from high-resolution and low-resolution inputs. In some embodiments, knowledge of a multiscale fusion teacher is appropriately distilled to a low-resolution student by arranging the feature maps of teacher and student networks. An example embodiment of the disclosure demonstrates that the framework outperforms baseline and vanilla multi-scale trained models by significant margins. Additionally, the low-resolution detection technique is compatible with compact networks. In some cases, the compact networks may be obtained with model compression techniques to reduce overall model complexity. The crossing feature-level fusion module may combine two light-weight models to achieve high instance-level detection performance and maintain low computational cost.

The description and drawings described herein represent example configurations and do not represent all the implementations within the scope of the claims. For example, the operations and steps may be rearranged, combined or otherwise modified. Also, structures and devices may be represented in the form of block diagrams to represent the relationship between components and avoid obscuring the described concepts. Similar components or features may have the same name but may have different reference numbers corresponding to different figures.

Some modifications to the disclosure may be readily apparent to those skilled in the art, and the principles defined herein may be applied to other variations without departing from the scope of the disclosure. Thus, the disclosure is not limited to the examples and designs described herein, but is to be accorded the broadest scope consistent with the principles and novel features disclosed herein.

In this disclosure and the following claims, the word "or" indicates an inclusive list such that, for example, the list of X, Y, or Z means X or Y or Z or XY or XZ or YZ or XYZ. Also, the phrase "based on" is not used to represent a closed set of conditions. For example, a step that is described as "based on condition A" may be based on both condition A and condition B. In other words, the phrase "based on" shall be construed to mean "based at least in part on." Also, the words "a" or "an" indicate "at least one."

What is claimed is:

1. A method of training a neural network, comprising:
receiving a high-resolution version of a student training image and a low-resolution version of the student training image;
generating a first feature map based on the high-resolution version of the student training image using a high-resolution encoder of a teacher network;
generating a second feature map based on the low-resolution version of the student training image using a low-resolution encoder of the teacher network;
generating a fused feature map based on the first feature map and the second feature map using a crossing feature-level fusion module of the teacher network;
generating a third feature map based on the low-resolution version of the student training image using an encoder of a student network;
computing a knowledge distillation (KD) loss based on a comparison of the third feature map from the student network and the fused feature map from the teacher network; and
updating parameters of the student network based on the KD loss.

2. The method of claim 1, comprising:
generating prediction information for an object in the student training image; and
computing a detection loss based on the prediction information, wherein the parameters of the student network are updated based on the detection loss.

3. The method of claim 1, comprising:
generating a plurality of fused feature maps using the teacher network, wherein each of the plurality of fused feature maps comprises a different resolution level;
generating a plurality of student training feature maps using the student network; and
comparing each of the plurality of fused feature maps to a corresponding feature map of the plurality of student training feature maps to obtain the KD loss.

4. The method of claim 1, comprising:
receiving a high-resolution version of a teacher training image and a low-resolution version of the teacher training image;
generating a first teacher training feature map based on the high-resolution version of the teacher training image using the high-resolution encoder of the teacher network;
generating a second teacher training feature map based on the low-resolution version of the teacher training image using the low-resolution encoder of the teacher network;
generating a fused teacher training feature map based on the first teacher training feature map and the second teacher training feature map using the crossing feature-level fusion module of the teacher network;
generating teacher prediction information for an object in the teacher training image;
computing a teacher detection loss based on the teacher prediction information; and
updating parameters of the teacher network based on the teacher detection loss.

5. The method of claim 1, further comprising:
computing a shift offset parameter based on a number of levels in the high-resolution encoder of the teacher network and a number of levels in the low-resolution encoder of the teacher network.

6. The method of claim 4, further comprising:
generating a first set of teacher training feature maps based on the high-resolution version of the teacher training image using the high-resolution encoder of the teacher network; and
generating a second set of teacher training feature maps based on the low-resolution version of the teacher training image using the low-resolution encoder of the teacher network.

7. The method of claim 4, further comprising:
generating high-resolution prediction information using the high-resolution encoder of the teacher network;
generating low-resolution prediction information using the low-resolution encoder of the teacher network; and
computing an arrangement loss based on the high-resolution prediction information and the low-resolution prediction information, wherein the parameters of the teacher network are updated based on the arrangement loss.

8. The method of claim 4, further comprising:
concatenating the first teacher training feature map and the second teacher training feature map along a channel dimension to obtain a concatenated teacher training feature map, wherein the fused teacher training feature map is generated based on the concatenated teacher training feature map.

9. An apparatus for training a neural network, comprising:
a high-resolution encoder of a teacher network configured to generate a first feature map based on a high-resolution version of a student training image;
a low-resolution encoder of the teacher network configured to generate a second feature map based on a low-resolution version of the student training image;
a crossing feature-level fusion module of the teacher network configured to generate a fused feature map based on the first feature map and the second feature map; and
an encoder of a student network configured to generate a third feature map based on the low-resolution version of the student training image, wherein the encoder of the student network is trained using a knowledge distillation (KD) loss based on a comparison of the third feature map from the student network and the fused feature map from the teacher network.

10. The apparatus of claim 9, further comprising:
a decoder of the teacher network configured to generate prediction information based on an output of the crossing feature-level fusion module.

11. The apparatus of claim 9, further comprising:
a decoder of the student network configured to decode the third feature map to obtain prediction information for the low-resolution version of the student training image.

12. The apparatus of claim 9, wherein:
the high-resolution encoder of the teacher network comprises a feature pyramid network (FPN) and the low-resolution encoder of the teacher network comprises an FPN with fewer levels than the high-resolution encoder of the teacher network.

13. The apparatus of claim 11, wherein:
the encoder of the student network comprises a same number of levels as the low-resolution encoder of the teacher network.

14. The apparatus of claim 9, wherein:
the first feature map is output from a third level of the high-resolution encoder of the teacher network and the second feature map is output from a second level of the low-resolution encoder of the teacher network, the second level being lower than the third level.

15. A non-transitory computer readable medium storing code for training a machine learning model, the code comprising instructions executable by at least one processor to:
receive a high-resolution version of a student training image and a low-resolution version of the student training image;
generate a first feature map based on the high-resolution version of the student training image using a high-resolution encoder of a teacher network;
generate a second feature map based on the low-resolution version of the student training image using a low-resolution encoder of the teacher network;
generate a fused feature map based on the first feature map and the second feature map using a crossing feature-level fusion module of the teacher network;
generate a third feature map based on the low-resolution version of the student training image using an encoder of a student network;
compute a knowledge distillation (KD) loss based on a comparison of the third feature map from the student network and the fused feature map from the teacher network; and
update parameters of the student network based on the KD loss.

16. The non-transitory computer readable medium of claim 15, the code further comprising instructions executable by the at least one processor to:
generate prediction information for an object in the student training image; and
compute a detection loss based on the prediction information, wherein the parameters of the student network are updated based on the detection loss.

17. The non-transitory computer readable medium of claim 15, the code further comprising instructions executable by the at least one processor to:
generate a plurality of fused feature maps using the teacher network, wherein each of the plurality of fused feature maps comprises a different resolution level;
generate a plurality of student training feature maps using the student network; and
compare each of the plurality of fused feature maps to a corresponding feature map of the plurality of student training feature maps to obtain the KD loss.

18. The non-transitory computer readable medium of claim 15, the code further comprising instructions executable by the at least one processor to:
receive a high-resolution version of a teacher training image and a low-resolution version of the teacher training image;
generate a first teacher training feature map based on the high-resolution version of the teacher training image using the high-resolution encoder of the teacher network;
generate a second teacher training feature map based on the low-resolution version of the teacher training image using the low-resolution encoder of the teacher network;
generate a fused teacher training feature map based on the first teacher training feature map and the second teacher training feature map using the crossing feature-level fusion module of the teacher network;
generate teacher prediction information for an object in the teacher training image;
compute a teacher detection loss based on the teacher prediction information; and
update parameters of the teacher network based on the teacher detection loss.

19. The non-transitory computer readable medium of claim 15, the code further comprising instructions executable by the at least one processor to:

compute a shift offset parameter based on a number of levels in the high-resolution encoder of the teacher network and a number of levels in the low-resolution encoder of the teacher network.

* * * * *